J. A. Burr,

Pulley Block.

No. 4,215. Reissued Dec. 27. 1870.

Witnesses.

H. C. W. Skinley

E. L. Boynton

Inventor

Joseph A. Burr by his attys

Whitney, Dana,

N. PETERS, PHOTO-LITHOGRAPHER, WASHINGTON, D. C.

United States Patent Office.

JOSEPH A. BURR, OF BROOKLYN, ASSIGNOR TO BURR & CO., OF NEW YORK, N. Y.

Letters Patent No. 108,446, dated October 18, 1870; reissue No. 4,215, dated December 27, 1870.

IMPROVEMENT IN HOISTING-BLOCKS.

The Schedule referred to in these Letters Patent and making part of the same.

*To all whom it may concern:*

Be it known that I, JOSEPH A. BURR, of Brooklyn, Kings county, New York, have invented, made, and applied to use certain new and useful Improvements in the Construction of Pulley-Blocks; and that the following is a full, clear, and correct description of my invention, reference being had to the accompanying drawing making part of this specification, and to the letters of reference marked thereon, in which—

In the drawing, like parts of the invention are pointed out by the same letters of reference.

Figure 1:
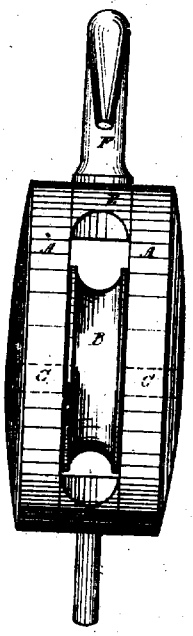
Figure 1 is a front view of a block made in accordance with my invention.
Figure 2:
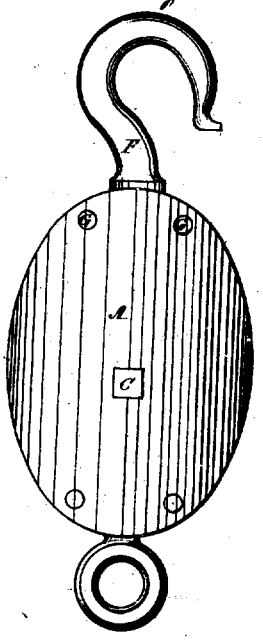
Figure 2 is a side view of the same.

The nature of my invention consists in certain improvements, as more fully hereinafter set forth in the construction of pulley-blocks.

The object of my invention is to furnish a strong block at a less cost than the weakest can now be produced for.

There are two distinct kinds of blocks now in use, namely, those strapped or bound with iron, which are the strongest and most expensive, and those strapped or bound with rope, which are much weaker and less expensive.

To furnish a mean between these two is the object of my invention.

In the drawing—

A represents the shell;

B, the sheave;

C, the sheave-pin;

D, the lower end-piece; and

E, the upper end-piece, which in my block I construct of metal.

F is the hook or fastening of the block, and

G G are rivets which hold the metallic end-piece to the shell, and through the shell to the sheave-pin and sheave.

In the patent granted Waterman and Russell, in 1844, the hook is fastened to a strip of metal which passes down through the inside of the shell, and the sheave-pin passes through this strap. This made the strongest block known.

I make no claim to any metallic connection between the hook and sheave-pin, which is covered in said patent.

I construct my block with an ordinary wooden shell, and with the same sheave and sheave-pin as is used in the ordinary block. The lower end-piece is also constructed in the ordinary way.

The upper end-piece I construct of cast iron, or other metal. Through this end-piece the rods are passed, and securely riveted on their ends, thus securing the metallic end-piece to the shell of the block; thence the work is transferred to the pin and sheave. Into the metallic end-piece the hook or fastening is secured in any convenient manner.

This makes a block of considerable strength, which may be furnished at a moderate cost.

Having thus set forth my invention,

What I claim as new is—

The metallic end-piece E, secured to the hook or fastening F of a pulley-block, as shown, and for the purposes described.

JOSEPH A. BURR.

Witnesses:

A. SIDNEY DOANE,

WM. HASTINGS.